US011789907B2

(12) United States Patent
Coady et al.

(10) Patent No.: US 11,789,907 B2
(45) Date of Patent: *Oct. 17, 2023

(54) QUANTUM FILE METADATA SERVICE

(71) Applicant: Red Hat, Inc., Raleigh, NC (US)

(72) Inventors: Stephen Coady, Waterford (IE); Leigh Griffin, Waterford (IE)

(73) Assignee: Red Hat, Inc., Raleigh, NC (US)

(*) Notice: Subject to any disclaimer, the term of this patent is extended or adjusted under 35 U.S.C. 154(b) by 152 days.

This patent is subject to a terminal disclaimer.

(21) Appl. No.: 16/939,668

(22) Filed: Jul. 27, 2020

(65) Prior Publication Data

US 2022/0027323 A1 Jan. 27, 2022

(51) Int. Cl.
G06F 16/00 (2019.01)
G06F 16/18 (2019.01)
G06N 10/00 (2022.01)
G06F 16/11 (2019.01)

(52) U.S. Cl.
CPC ............ G06F 16/18 (2019.01); G06F 16/116 (2019.01); G06N 10/00 (2019.01)

(58) Field of Classification Search
CPC ...... G06F 16/18; G06F 16/116; G06F 16/162; G06F 16/1734; G06F 10/10
See application file for complete search history.

(56) References Cited

U.S. PATENT DOCUMENTS

| 8,266,121 | B2 | 9/2012 | Roitblat et al. | |
| 11,048,590 | B1* | 6/2021 | Sapuntzakis | G06F 11/1448 |
| 11,301,152 | B1* | 4/2022 | Sillifant | G06F 3/067 |
| 2007/0130229 | A1* | 6/2007 | Anglin | G06F 16/40 |
| 2009/0063430 | A1* | 3/2009 | Anglin | G06F 16/40 |
| 2009/0157989 | A1* | 6/2009 | Karamcheti | G06F 12/0246 711/E12.001 |
| 2010/0184025 | A1* | 7/2010 | Bailey | C12Q 1/6876 435/6.1 |
| 2011/0295856 | A1* | 12/2011 | Roitblat | G06F 16/35 707/E17.046 |
| 2013/0218854 | A1* | 8/2013 | Mungi | G06F 16/10 707/697 |
| 2014/0280200 | A1* | 9/2014 | Dwan | G06F 16/2477 707/746 |
| 2019/0286373 | A1* | 9/2019 | Karumbunathan | G06F 3/065 |
| 2020/0074346 | A1* | 3/2020 | Griffin | G06N 20/00 |
| 2020/0125402 | A1* | 4/2020 | Griffin | G06F 9/5027 |
| 2020/0334563 | A1* | 10/2020 | Gambetta | B82Y 10/00 |

OTHER PUBLICATIONS

Paler et al., "Reliable Quantum circuits have defects", XRDS (Year: 2016).*
Humble et al.; Quantum Computers for High-Performance Computing; IEEE 2021.*
Author Unknown, "Welcome to FlexSync™," Quantum Corporation, https://qsupport.quantum.com/kb/flare/Content/stornext/FlexSync_DocSite/FlexSync_DocCenter/Topics/FSy_Overview.htm?TocPath=Get%20Started%7C_1, accessed Jan. 7, 2020, 2 pages.

* cited by examiner

Primary Examiner — Daniel A Kuddus
(74) Attorney, Agent, or Firm — Dority & Manning, P.A.

(57) ABSTRACT

A quantum file attribute service is disclosed. A quantum computing system receives a file metadata command requesting quantum file metadata. It is determined that a quantum file is encompassed by the file metadata command, the quantum file comprising a qubit. Quantum file metadata that identifies information about the quantum file is accessed. The quantum file metadata includes a qubit identifier that identifies the qubit. The quantum file metadata is sent to a destination.

18 Claims, 11 Drawing Sheets

| FILE | OWNER | QUANTUM SERVICE | QUANTUM CHANNEL | PROCESS ID | QBITS | ENT. | QASM |
|---|---|---|---|---|---|---|---|
| QF1 | USER1 | A | 1 | 4334 | 1-1 (QCS 1, QBIT 1) | N | QSA |
| | | | | | 1-3 (QCS 1, QBIT 3) | N | |

CREATION DATE: 2019-06-12-14:23.3245    LAST ACCESSED: 2020-06-12-14:23.3245

| FILE | OWNER | QUANTUM SERVICE | QUANTUM CHANNEL | PROCESS ID | QBITS | ENT. | QASM |
|---|---|---|---|---|---|---|---|
| QF2 | USER2 | B | 2 | 2123 | 1-3 (QCS 1, QBIT3) | Y | QSB |
| | | | | | 3-2 (QCS 3, QBIT 2) | Y | |

CREATION DATE: 2020-03-04-11:12.1324    LAST ACCESSED: 2020-05-12-14:23.3245

QUANTUM FILE METADATA SERVICE

BACKGROUND

Quantum computing utilizes qubits to perform quantum calculations. Qubits are finite resources. As quantum computing continues to increase in popularity and become more commonplace, an ability to programmatically coordinate access to qubits will be desirable.

SUMMARY

The examples disclosed herein implement a quantum file metadata service that receives a request for quantum file metadata associated with one or more quantum files, and accesses various data structures to consolidate metadata associated with the one or more quantum files, and returns the quantum file metadata to the requestor.

In one example, a method is provided. The method includes receiving, by a quantum computing system, a file metadata command requesting quantum file metadata. The method further includes determining, by the quantum computing system, that a quantum file is encompassed by the file metadata command, the quantum file comprising a qubit. The method further includes accessing, by the quantum computing system, quantum file metadata that identifies information about the quantum file, the quantum file metadata comprising a qubit identifier that identifies the qubit. The method further includes sending, by the quantum computing system to a destination, the quantum file metadata.

In another example, a quantum computing system is provided. The quantum computing system includes a memory and a processor device coupled to the memory to receive a file metadata command requesting quantum file metadata. The processor device is further to determine that a quantum file is encompassed by the file metadata command, the quantum file comprising a qubit. The processor device is further to access quantum file metadata that identifies information about the quantum file, the quantum file metadata comprising a qubit identifier that identifies the qubit. The processor device is further to send, to a destination, the quantum file metadata.

In another example, a non-transitory computer-readable storage medium is provided. The non-transitory computer-readable storage medium includes instructions to cause a processor device to receive a file metadata command requesting quantum file metadata. The instructions further cause the processor device to determine that a quantum file is encompassed by the file metadata command, the quantum file comprising a qubit. The instructions further cause the processor device to access quantum file metadata that identifies information about the quantum file, the quantum file metadata comprising a qubit identifier that identifies the qubit. The instructions further cause the processor device to send, to a destination, the quantum file metadata.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 6 is a diagram that may be presented on a display device in response to a request from an operator for quantum file metadata, according to one implementation;

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing utilizes qubits to perform quantum calculations. Qubits are finite resources. As quantum computing continues to increase in popularity and become more commonplace, an ability to programmatically coordinate access to qubits will be desirable.

U.S. patent application Ser. No. 16/859,571, the disclosure of which is hereby incorporated herein by reference in its entirety, discloses a quantum file management system that operates to create quantum files that comprise a plurality of qubits. It will be desirable, as quantum files are increasingly utilized, to be able to obtain attributes about one or more quantum files, such as, by way of non-limiting example, information such as which qubits make up the quantum file, the owner of the quantum file, the creation date of the quantum file, whether it is safe to access the quantum file, and the like. However, this information may be maintained in various locations of a quantum computing system, and the information may thus not be easily accessible to a requestor.

The examples disclosed herein implement a quantum file metadata service that receives a request for quantum file metadata for one or more quantum files, and accesses various data structures to consolidate metadata associated with the one or more quantum files, and returns the quantum file metadata to the requestor.

Figure 1:
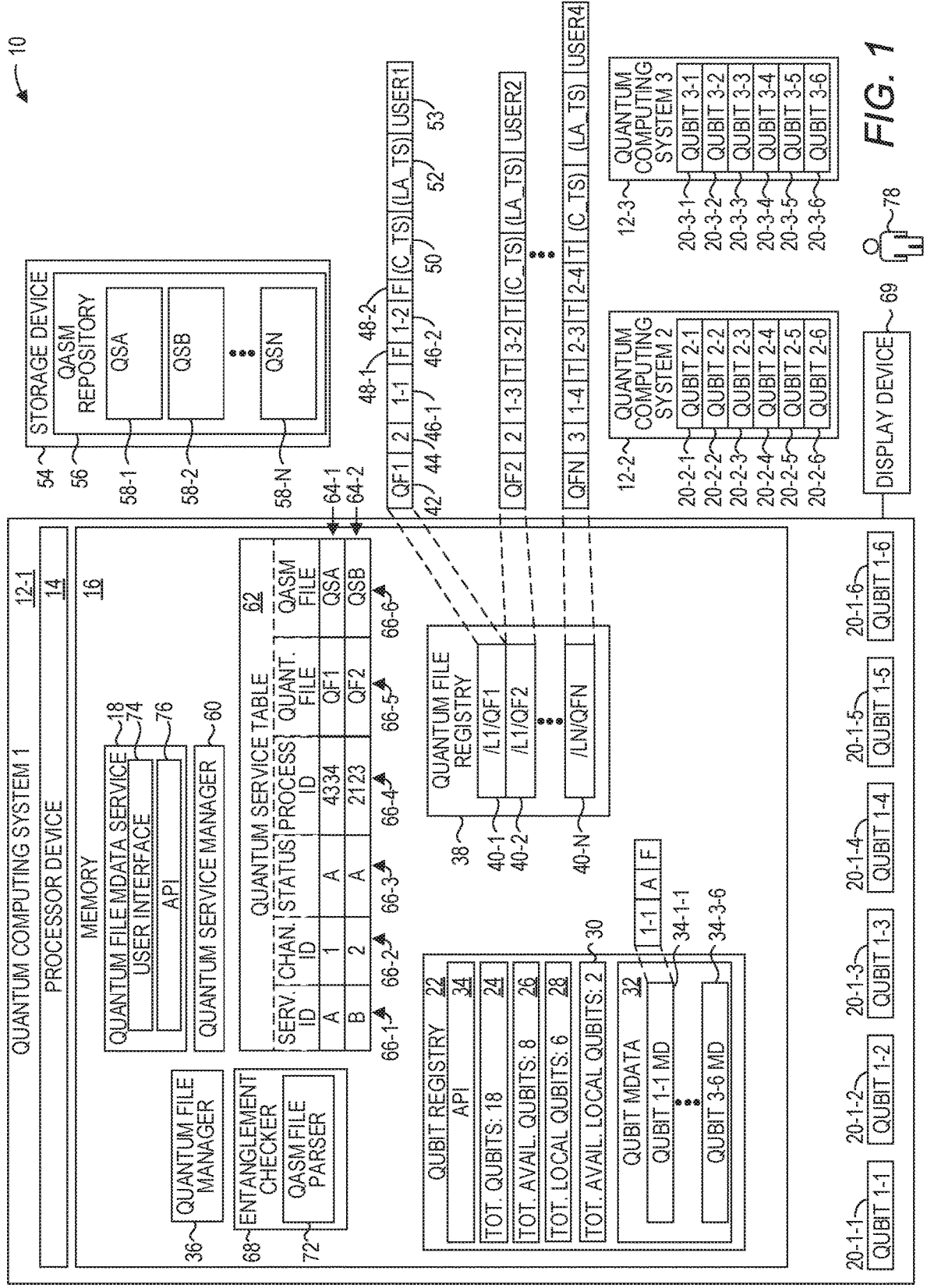
FIG. 1 is a block diagram of an environment in which examples may be practiced.

FIG. 1 is a block diagram of an environment 10 in which examples may be practiced. The environment 10 includes a plurality of quantum computing systems 12-1, 12-2 and 12-3 (generally, quantum computing systems 12). The quantum computing systems 12 may be close in physical proximity to one another, or may be relatively long distances from one another, such as hundreds or thousands of miles from one another. The quantum computing systems 12 operate in quantum environments but can operate using classical computing principles or quantum computing principles. When using quantum computing principles, the quantum computing systems 12 perform computations that utilize quantum-mechanical phenomena, such as superposition and entanglement. The quantum computing systems 12 may operate under certain environmental conditions, such as at or near 0° Kelvin. When using classical computing principles, the quantum computing systems 12 utilize binary digits that have a value of either 1 or 0. While only three quantum computing systems are illustrated due to space considerations, any number of quantum computing systems may communicate with one another to implement the quantum file metadata service, as discussed herein. Moreover, while, for space considerations, only the quantum computing system 12-1 is illustrated with multiple components, the quantum computing systems 12-2-12-3 may have similar components as those described herein with regard to the quantum computing system 12-1.

The quantum computing system 12-1 includes at least one processor device 14 and at least one memory 16. A number of example components of the quantum computing system 12-1 will be described herein, first briefly, then in greater detail below. The quantum computing system 12-1 includes a quantum file metadata service 18 that operates to obtain quantum file metadata about one or more quantum files. The phrase "quantum file metadata" refers to information that relates to a particular quantum file, such as a file name, a creation date of the quantum file, a last access date of the quantum file, or some other attribute relating to the quantum file. Quantum file metadata is information about the quantum file and is separate from the content (e.g., data) stored in the quantum file itself.

The quantum computing system 12-1 implements six qubits 20-1-1-20-1-6; the quantum computing system 12-2 implements six qubits 20-2-1-20-2-6; and the quantum computing system 12-3 implements six qubits 20-3-1-20-3-6. The quantum computing system 12-1 includes a qubit registry 22 which maintains information about the qubits 20-1-1-20-3-6, including, by way of non-limiting example, a total qubits counter 24 that maintains count of the total number of qubits implemented by the quantum computing systems 12-1-12-3, a total available qubits counter 26 that maintains count of the total number of qubits that are currently available for allocation, a total local qubits counter 28 that maintains count of the total number of qubits implemented by the quantum computing system 12-1 only, and a total available local qubits counter 30 that maintains count of the total number of qubits that are currently available for allocation on the quantum computing system 12-1.

The qubit registry 22-1 also maintains qubit metadata 32, which comprises a plurality of metadata records 34-1-1-34-3-6, each of which maintains information about a corresponding qubit 20-1-1-20-3-6, such as, by way of non-limiting example, an identifier of the corresponding qubit 20-1-1-20-3-6, a quantum service identifier of the quantum service currently using the corresponding qubit 20-1-1-20-3-6, whether the corresponding qubit 20-1-1-20-3-6 is currently in an entangled state, or the like. The quantum computing systems 12-2-12-3 may also maintain qubit metadata about the qubits 20-1-1-20-3-6. As changes to the qubits 20-1-1-20-1-6 occur, the qubit registry 22 generates and transmits qubit update records to the quantum computing systems 12-2-12-3 so that the quantum computing systems 12-2-12-3 maintain up-to-date metadata about the qubits 20-1-1-20-3-6. Qubit registries (not illustrated) on the quantum computing systems 12-2-12-3 similarly generate and transmit qubit update records upon changes to the qubits 20 implemented on the respective quantum computing systems 12-2-12-3, so that each of the quantum computing systems 12-1-12-3 maintain up-to-date metadata about the qubits 20-1-1-20-3-6.

The quantum computing system 12-1 controls access to the qubits 20-1-1-20-3-6 via a quantum file structure that is controlled by a quantum file management system. The quantum file management system includes a quantum file manager 36 and a quantum file registry 38. The quantum file registry 38 includes metadata regarding quantum files implemented in the quantum computing systems 12-1-12-3. The quantum file registry 38 includes a plurality of quantum file records 40-1, 40-2-40-N (generally, quantum file records 40), each of which corresponds to and identifies a quantum file owned by the quantum computing system 12-1. Each quantum file comprises one or more of the qubits 20-1-1-20-3-6, and each of the qubits 20-1-1-20-3-6 corresponds, at a given point in time, to only one quantum file. Each respective quantum file record 40 includes metadata describing attributes of the respective quantum file that corresponds to the respective quantum file record 40. The quantum file record 40-1 defines a quantum file having an identifier of QF1.

The quantum file management system may implement a folder (e.g., directory) system wherein quantum files may be placed in different folders. In this example, the quantum files that correspond to the quantum file records 40-1 and 40-2 are in a folder "L1", and the quantum file that corresponds to the quantum file record 40-N is in a folder "LN".

As an example of the content of a quantum file record 40, the quantum file record 40-1 includes an internal identifier field 42 that identifies the quantum file QF1. A size field 44 identifies the number of qubits that make up the quantum file QF1. The quantum file record 40-1 contains, for each qubit that makes up the quantum file QF1, a qubit identification field and an entanglement status field. In this example, a qubit identification field 46-1 contains a qubit identifier (1-1) that identifies the qubit 20-1-1 implemented by the quantum computing system 12-1; an entanglement field 48-1 indicates that the qubit 20-1-1 is not currently in an entangled state with any other qubit; a qubit identification field 46-2 contains a qubit identifier (1-2) that identifies the qubit 20-1-2 implemented by the quantum computing system 12-1; and an entanglement field 48-2 that indicates that the qubit 20-1-2 is not currently in an entangled state with any other qubit. The quantum file record 40-1 includes a creation timestamp field 50 that identifies a creation date and time of the quantum file QF1, a last access timestamp field 52 that identifies a date and time of a last access of the quantum file QF1, and an owner field 53 that identifies an owner of the quantum file QF1.

A quantum file may be generated in any of a number of different ways. In one example, an operator 78 may interact with the quantum file manager 36 via a user interface to define a quantum file. The operator 78 may specify a name for the quantum file and particular qubits 20-1-1-20-3-6 to be used for the quantum file, or may request that a particular number of qubits 20 be assigned to the quantum file. The quantum file manager 36 may access the qubit registry 22 to locate available qubits 20, or, if particular qubits 20 have been designated, may access the qubit registry 22 to ensure that such qubits 20 are available. The quantum file manager 36 may then generate a suitable quantum file record 40 that corresponds to the quantum file. The quantum file manager 36 also updates the qubit registry 22 as appropriate. The qubit registry 22 may send qubit update records to the quantum computing systems 12-2 and 12-3.

The quantum computing system 12-1 includes or is communicatively coupled to one or more storage devices 54. The storage device 54 implements a quantum assembly language (QASM) repository 56 in which a plurality of QASM files 58-1-58-N are stored. The quantum computing system 12-1 is capable of initiating a plurality of different quantum services. The term "quantum service" as used herein refers to a quantum application that accesses one or more of the qubits 20-1-1-20-3-6, typically by reference to a quantum file, and provides some desired functionality. Each quantum service is implemented via a corresponding QASM file 58-1-58-N, each of which comprises quantum computing instructions. In this example, the QASM file 58-1 corresponds to a quantum service A; the QASM file 58-2 corresponds to a quantum service B; and the QASM file 58-N corresponds to a quantum service N. This correspondence information may be stored and accessible to components of the quantum computing system 12-1. The QASM files 58 may utilize quantum files to provide a desired function. The QASM files 58 may explicitly identify a quantum file, or may be initiated with runtime variables that identify a particular quantum file.

In some implementations, the quantum computing system 12-1 includes a quantum service manager 60 which maintains a quantum service table 62 that includes information that describes a current state of certain quantum services executing on the quantum computing system 12-1. In this example, the quantum service table 62 includes a plurality of rows 64-1-64-2 (generally, rows 64), each of which corresponds to a particular quantum service.

Each row 64 contains six data fields 66-1-66-6. The data field 66-1 identifies the particular quantum service that is associated with that row 64. The data field 66-2 identifies a particular quantum channel utilized by the quantum service that is associated with that row 64. The data field 66-3 identifies a current status of the quantum service associated with that row 64. The data field 66-4 contains a process identifier (ID) associated with the quantum service, if the quantum service is currently active (e.g., executing). The data field 66-5 identifies one or more quantum files used by the quantum service associated with that row 64. The data field 66-6 identifies the QASM file 58 that implements the quantum service associated with that row 64.

At the point in time illustrated in FIG. 1, the row 64-1 corresponds to the quantum service A. The data field 66-1 of the row 64-1 indicates that the row 64-1 corresponds to the quantum service A. The data field 66-2 of the row 64-1 indicates that the quantum service A utilizes channel 1. The data field 66-3 of the row 64-1 indicates that the quantum service A is currently active (i.e., currently executing). The data field 66-4 identifies a process ID of 4334 for the executing quantum service A. The data field 66-5 identifies the quantum file QF1 as being utilized by the service A. The data field 66-6 indicates that the service A is implemented by the QASM file 58-1.

The row 64-2 corresponds to the quantum service B, implemented by the QASM file 58-2. The data field 66-1 of the row 64-2 indicates that the row 64-2 corresponds to the quantum service B. The data field 66-2 of the row 64-2 indicates that the quantum service B utilizes channel 2. The data field 66-3 of the row 64-2 indicates that the quantum service B is currently active (i.e., currently executing). The data field 66-4 identifies a process ID of 2123 for the executing quantum service B. The data field 66-5 identifies the quantum file QF2 as being utilized by the quantum service B. The data field 66-6 indicates that the quantum service B is implemented by the QASM file 58-2.

The quantum computing system 12-1 includes an entanglement checker 68 that operates to determine whether one or more of the qubits 20-1-1-20-3-6 are entangled. The entanglement checker 68 may determine an entanglement status of one or more of the qubits 20-1-1-20-3-6 periodically, intermittently, upon request, or in response to some event on the quantum computing system 12-1.

The entanglement checker 68 accesses the QASM files 58-1-58-N to determine if the quantum services that utilize the qubits 20-1-1-20-3-6 entangle the qubits 20-1-1-20-3-6. The entanglement checker 68 parses the respective QASM files 58 in accordance with a QASM programming language syntax. The entanglement checker 68 identifies programming instructions that, when executed, cause a qubit 20-1-1-20-3-6 to become entangled. The entanglement checker 68 accesses correspondence information (not illustrated) that identifies the correspondence between the QASM files 58 and the quantum services A-N.

As an example, the entanglement checker 68 may access the row 64-1 of the quantum service table 62 which corresponds to the quantum service A. The entanglement checker 68 may access the data field 66-5 of the row 64-1 of the quantum service table 62 to determine that the quantum service A utilizes the quantum file QF1, which corresponds to the quantum file record 40-1. The entanglement checker 68 may access the quantum file record 40-1 and determine that the quantum file QF1 is composed of the qubits 20-1-1 and 20-1-2. The entanglement checker 68 may access the data field 66-6 of the row 64-1 of the quantum service table 62 to determine that the quantum service A is implemented via the QASM file 58-1.

The entanglement checker 68 accesses the QASM file 58-1. The QASM file 58-1 includes a plurality of quantum instructions in a quantum programming language. The entanglement checker 68 reads the quantum instructions, parses the quantum instructions in accordance with a syntax of the respective programming language, and analyzes the quantum instructions. In some implementations, the parsing function described herein may be implemented in a QASM file parser 72 component of the entanglement checker 68. Based on a "qreg q[2]" instruction, the entanglement checker 68 makes a determination that the quantum service A uses two qubits 20. The correspondence between the qubits 20-1-1 and 20-1-2 and the qubits manipulated in the QASM file 58-1 may be via an explicit identifier, or may be maintained elsewhere, such as the quantum file registry 38, the qubit metadata 32, and/or the quantum service table 62. Based on an absence of any programming instructions that causes either of the qubits 20-1-1 or 20-1-2 to be entangled, the entanglement checker 68 determines that neither of the qubits 20-1-1 and 20-1-2 are entangled. The entanglement checker 68 sends a message to the quantum file registry 38 to set the entanglement fields 48-1 and 48-2 of the quantum file record 40-1 to a value of F (false) to indicate that neither of the qubits 20-1-1 and 20-1-2 are entangled. The entanglement checker 68 may also update the qubit metadata records 34 that correspond to the qubits 20-1-1 and 20-1-2 to indicate that such qubits are not entangled.

As another example, the entanglement checker 68 may access the row 64-2 of the quantum service table 62 which corresponds to the quantum service B. The entanglement checker 68 may access the data field 66-5 of the row 64-2 of the quantum service table 62 to determine that the quantum service B utilizes the quantum file QF2, which corresponds to the quantum file record 40-2. The entanglement checker 68 may access the quantum file record 40-2 and determine that the quantum file QF2 is composed of the qubits 20-1-3 and 20-3-2. The entanglement checker 68 may access the data field 66-6 of the row 64-2 of the quantum service table 62 to determine that the quantum service B is implemented via the QASM file 58-2.

The entanglement checker 68 accesses the QASM file 58-2. The entanglement checker 68 reads the quantum instructions, parses the quantum instructions in accordance with a syntax of the respective programming language, and analyzes the quantum instructions. Based on a "cx q[1],q[2]" instruction, which utilizes the cnot gate, the entanglement checker 68 makes a determination that, if quantum service B is executing, the qubits 20-1-3 and 20-3-2 are entangled. The entanglement checker 68 accesses the data field 66-3 of the row 64-2 of the quantum service table 62 and determines that the quantum service B is executing. The entanglement checker 68 thus determines that the qubits 20-1-3 and 20-3-2 are entangled. The entanglement checker 68 sends a message to the quantum file registry 38 to set the entanglement fields 48-1 and 48-2 of the quantum file record 40-2 to a value of T (true) to indicate that both of the qubits 20-1-3 and 20-3-2 are entangled. The entanglement checker 68 may also update the qubit metadata records 34 that correspond to the qubits 20-1-3 and 20-3-2 to indicate that such qubits are entangled.

Upon request, the quantum file metadata service 18 interacts with one or more of the quantum service table 62, the entanglement checker 68, the quantum file registry 38, the QASM repository 56 and the qubit registry 22 to obtain metadata about a quantum file (i.e., quantum file metadata). In some implementations, the quantum file metadata service 18 may offer a user interface 74 via which the operator 78 may request to view quantum file metadata for one or more quantum files. The quantum file metadata service 18 may also offer an application programming interface (API) 76, or other inter-process communications mechanism that facilitates communications with other running processes on the quantum computing system 12-1. While solely for purposes of illustration and explanation, the quantum file metadata service 18 is shown separately from other components executing on the quantum computing system 12-1, in practice, the functionality described herein with regard to the quantum file metadata service 18 could be implemented by any one or more of the other components illustrated herein, such as, by way of non-limiting example, the quantum file manager 36, the qubit registry 22, or the quantum file registry 38.

For purposes of illustration, assume that the operator 78 enters into the user interface 74 a request to obtain quantum file metadata that is associated with the quantum file QF1. The quantum file metadata service 18 receives the request via the user interface 74. In this example, the request may simply include the quantum file name QF1. The quantum file metadata service 18 may initially communicate with the entanglement checker 68 to cause the entanglement checker 68 to determine if any of the qubits 20 that compose the quantum file QF1 are entangled. The entanglement checker 68 implements the process described above, and thus ensures that the quantum file record 40-1 contains real-time entanglement status information (e.g., entanglement fields 48-1 and 48-2) for the qubits 20 that compose the quantum file QF1.

The quantum file metadata service 18 may then communicate with the quantum file registry 38 to obtain the quantum file metadata contained in quantum file record 40-1. The quantum file metadata service 18 may communicate with the quantum service manager 60 requesting any information about any service that utilizes the quantum file QF1. The quantum service manager 60 accesses the quantum service table 62 and determines that the quantum file QF1 is used by the quantum service A. The quantum service manager 60 returns to the quantum file metadata service 18 the information in the data fields 66-1-66-6 of the row 64-1 that corresponds to the quantum service A. The quantum file metadata service 18 may also communicate with the qubit registry 22 to obtain qubit metadata for the qubits 20-1-1 and 20-1-2 that compose the quantum file QF1.

The quantum file metadata service 18 consolidates the quantum file metadata obtained from the various components described above, and generates formatted quantum file information based on the quantum file metadata. The formatted quantum file information may comprise, for example, the various metadata in conjunction with labels that identify what the metadata is, such as a filename, a creation timestamp, and the like. The quantum file metadata service 18 presents, on a display device 69, the formatted quantum file information.

Because the quantum file metadata service 18 is a component of the quantum computing system 12-1, functionality implemented by the quantum file metadata service 18 may be attributed to the quantum computing system 12-1 generally. Moreover, in examples where the quantum file metadata service 18 comprises software instructions that program the processor device 14 to carry out functionality discussed herein, functionality implemented by the quantum file metadata service 18 may be attributed herein to the processor device 14.

Figure 2:
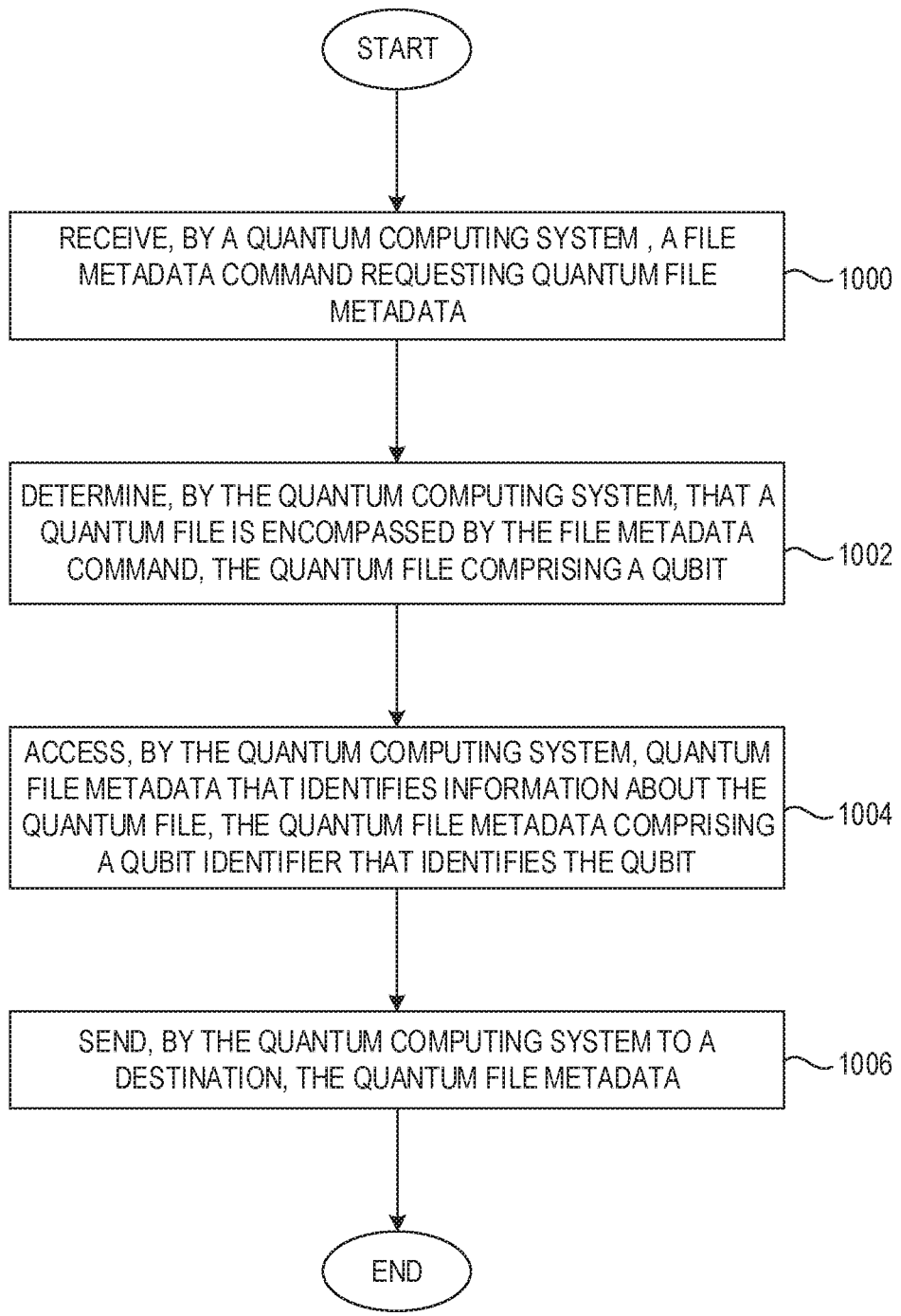
FIG. 2 is a flowchart of a method for obtaining quantum file metadata according to one example.

FIG. 2 is a method for obtaining quantum file metadata according to one example. FIG. 2 will be discussed in conjunction with FIG. 1. The quantum computing system 12 receives a file metadata command requesting quantum file metadata (FIG. 2, block 1000). The file metadata command may be received via, for example, the user interface 74, or via the API 76 from a process executing on the quantum computing system 12-1 or executing on another quantum computing system. The quantum computing system 12-1 determines that the quantum file QF1 is encompassed by the file metadata command, the quantum file QF1 comprising the qubit 20-1-1 and the qubit 20-1-2 (FIG. 2, block 1002). The quantum computing system 12-1 may make the determination that the quantum file QF1 is encompassed by the file metadata command based on information included with the file metadata command. The information may, for example, identify the quantum file QF1, or identify a folder or parent folder of the quantum file QF1, or comprise other information from which the quantum computing system 12-1 deduces that the quantum file QF1 is encompassed by the file metadata command.

The quantum computing system 12-1 accesses the quantum file metadata that identifies information about the quantum file QF1, the quantum file metadata comprising the qubit identifier 1-1 that identifies the qubit 20-1-1 and the qubit identifier 1-2 that identifies the qubit 20-1-2 (FIG. 2, block 1004). The quantum computing system 12-1 sends the quantum file metadata to a destination (FIG. 2, block 1006). The destination may comprise, for example, the display device 69, or, if the file metadata command was sent by a process executing on the quantum computing system 12-1, the destination may comprise the process.

Figure 3:
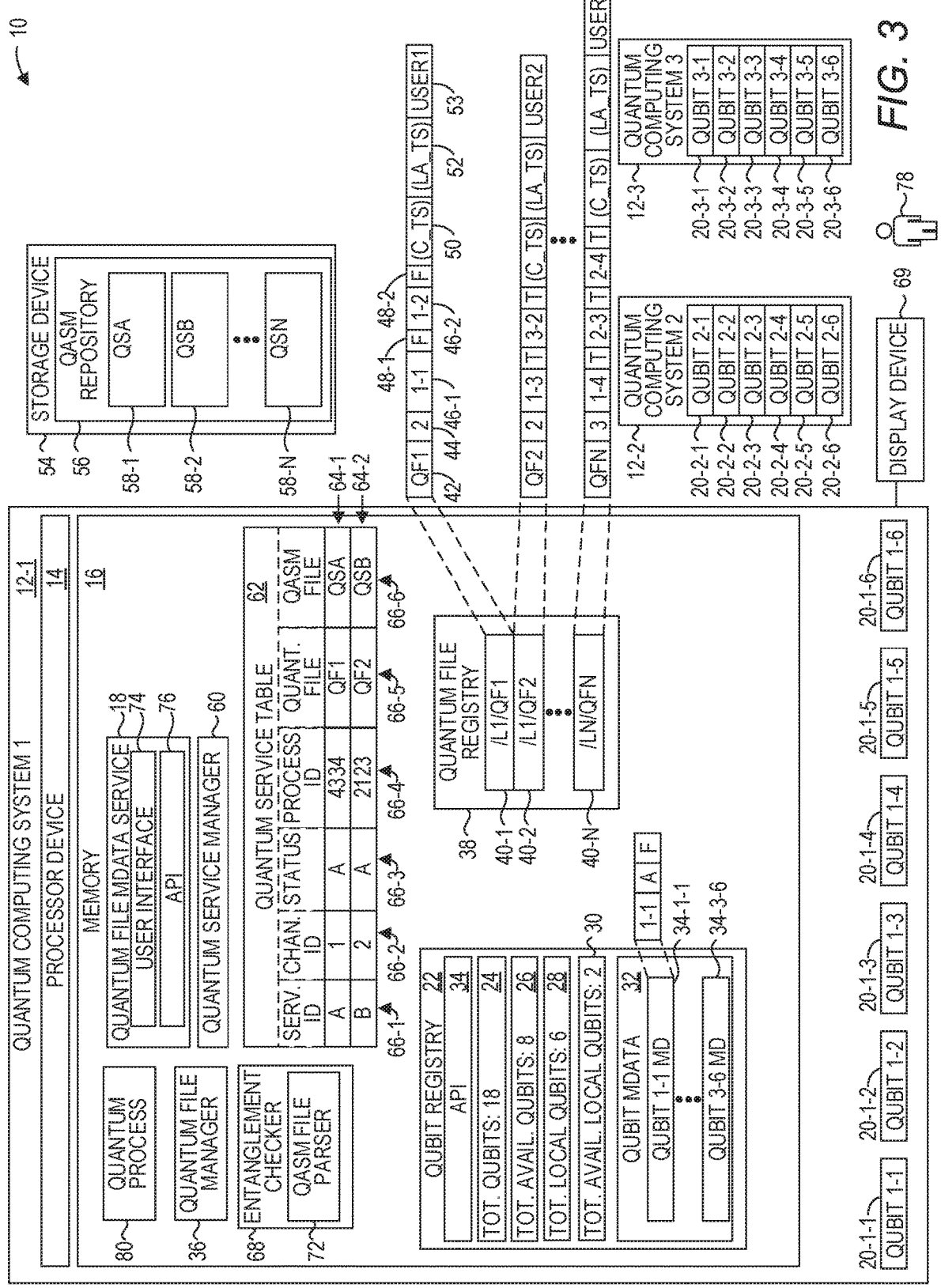
FIG. 3 is a block diagram of the environment illustrated in FIG. 1 in which additional examples may be practiced.
Figure 4A:
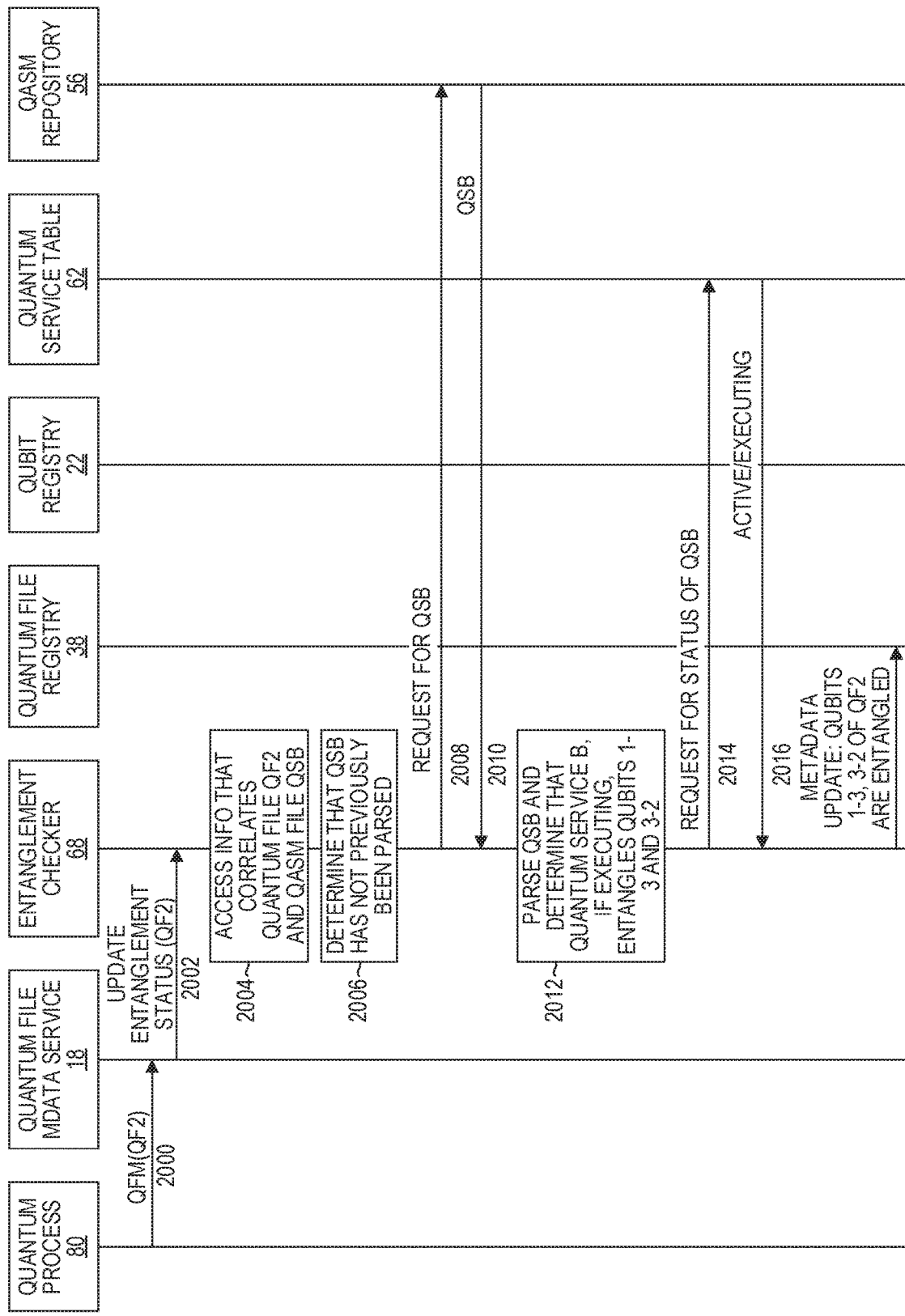
FIGS. 4A-4B illustrate a message sequence diagram that depicts messages communicated between and actions taken by various components of the quantum computing system illustrated in FIG. 3, according to one example.
Figure 4B:
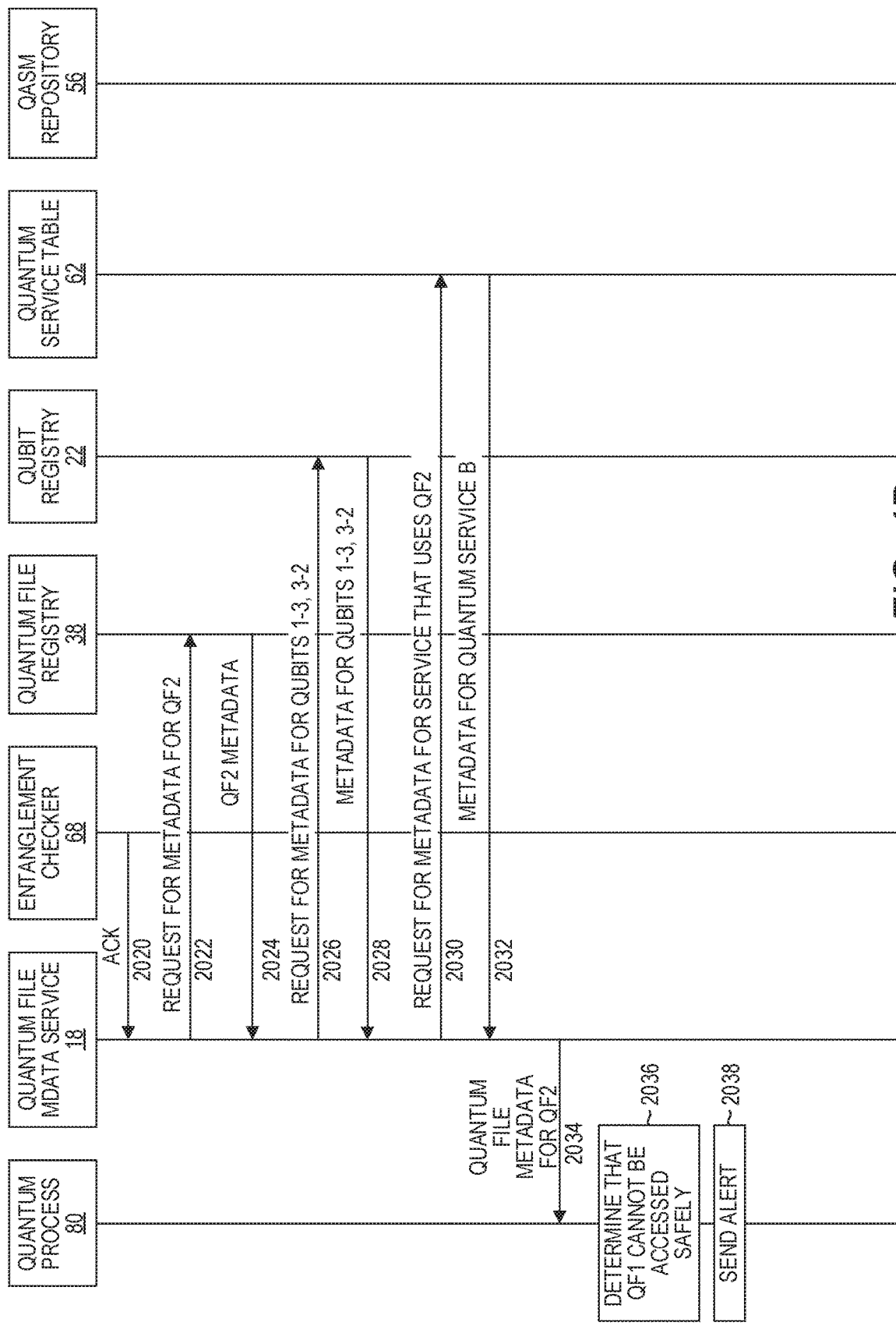

FIG. 3 is a block diagram of the environment 10 in which additional examples may be practiced. FIGS. 4A-4B illustrate a message sequence diagram that depicts messages communicated between and actions taken by various components of the quantum computing system 12-1 illustrated in FIG. 3, according to one example. FIG. 3 and FIGS. 4A-4B will be discussed in conjunction with one another. Referring first to FIG. 3, a quantum process 80 has initiated. The quantum process 80 is programmed to read the quantum file QF2. However, the quantum process 80 should not access the quantum file QF2 if any of the qubits that compose the quantum file QF1 are entangled. Referring now to FIG. 4A, the quantum process 80 sends a request to the quantum file metadata service 18 for the quantum file metadata of the quantum file QF2 (FIG. 4A, block 2000). The request may be sent, for example, by invoking the API 76, and identifying the quantum file QF2. The quantum file metadata service 18 receives the request, and sends a request/message to the entanglement checker 68 to update the entanglement status of the qubits that compose the quantum file QF2 (FIG. 4A, block 2002). The entanglement checker 68 accesses information that correlates the quantum file QF2 with the QASM file 58-2 (QSB) (FIG. 4A, block 2004). The entanglement checker 68 determines that the QASM file QSB has not previously been parsed by the entanglement checker 68 (FIG. 4A, block 2006). For example, the entanglement checker 68 may store information that indicates whether or not the entanglement checker 68 has previously accessed and parsed a particular QASM file. The entanglement checker 68 requests the QASM file QSB from the QASM repository 56 (FIG. 4A, block 2008).

The QASM repository 56 sends the QASM file QSB to the entanglement checker 68 (FIG. 4A, block 2010). The entanglement checker 68 parses the QASM file QSB, and determines that the quantum service B, if executing, entangles the qubits 20-1-3 and 20-3-2 (FIG. 4A, block 2012). The entanglement checker 68 sends a request for the status of the quantum service B to the quantum service table 62 (either directly, or via the quantum service manager 60) (FIG. 4A, block 2014). The quantum service table 62 responds indicating that the quantum service B is active/executing (FIG. 4A, block 2016). The entanglement checker 68 sends a metadata update message to the quantum file registry 38 (either directly, or via the quantum file manager 36) to indicate that the qubits 20-1-3 and 20-3-2 are entangled (FIG. 4A, block 2018).

Referring now to FIG. 4B, the entanglement checker 68 sends an acknowledgement message to the quantum file metadata service 18 indicating that the entanglement checker 68 has updated the entanglement status of the qubits 20 associated with the quantum file QF2 (FIG. 4B, block 2020). The quantum file metadata service 18 sends a request to the quantum file registry 38 for the metadata associated with the quantum file QF2 (FIG. 4B, block 2022). The quantum file registry 38 responds with the metadata from the quantum file record 40-2 of the quantum file registry 38 (FIG. 4B, block 2024). The quantum file metadata service 18 sends a request to the qubit registry 22 for the metadata associated with the qubits 20-1-3 and 20-3-2 (FIG. 4B, block 2026). The qubit registry 22 responds with the metadata associated with the qubits 20-1-3 and 20-3-2 (FIG. 4B, block 2028). The quantum file metadata service 18 sends a request to the quantum service table 62 (either directly, or via the quantum service manager 60) for the metadata associated with the quantum service that uses the quantum file QF2 (FIG. 4B, block 2030). The quantum service table 62 responds with the metadata contained in the row 64-2 of the quantum service table 62 (FIG. 4B, block 2032).

The quantum file metadata service 18 consolidates the metadata obtained from the quantum file registry 38, the qubit registry 22, and the quantum service table 62, and sends the metadata to the quantum process 80 (FIG. 4B, block 2034). The quantum process 80 determines, based on the metadata, that the qubits 20-1-3 and 20-3-2 are entangled, and thus that the quantum file QF2 cannot currently be accessed (FIG. 4B, block 2036). The quantum process 80 may then take some desired action or actions, such as waiting a predetermined period of time and iterating through the process described in FIGS. 4A-4B, until the quantum service B is no longer active, and thus the qubits 20-1-3 and 20-3-2 are not entangled. In some examples, the quantum process 80 may send an alert or other message to the display device 69 for presentation to the operator 78 (FIG. 4B, block 2038).

Figure 5:
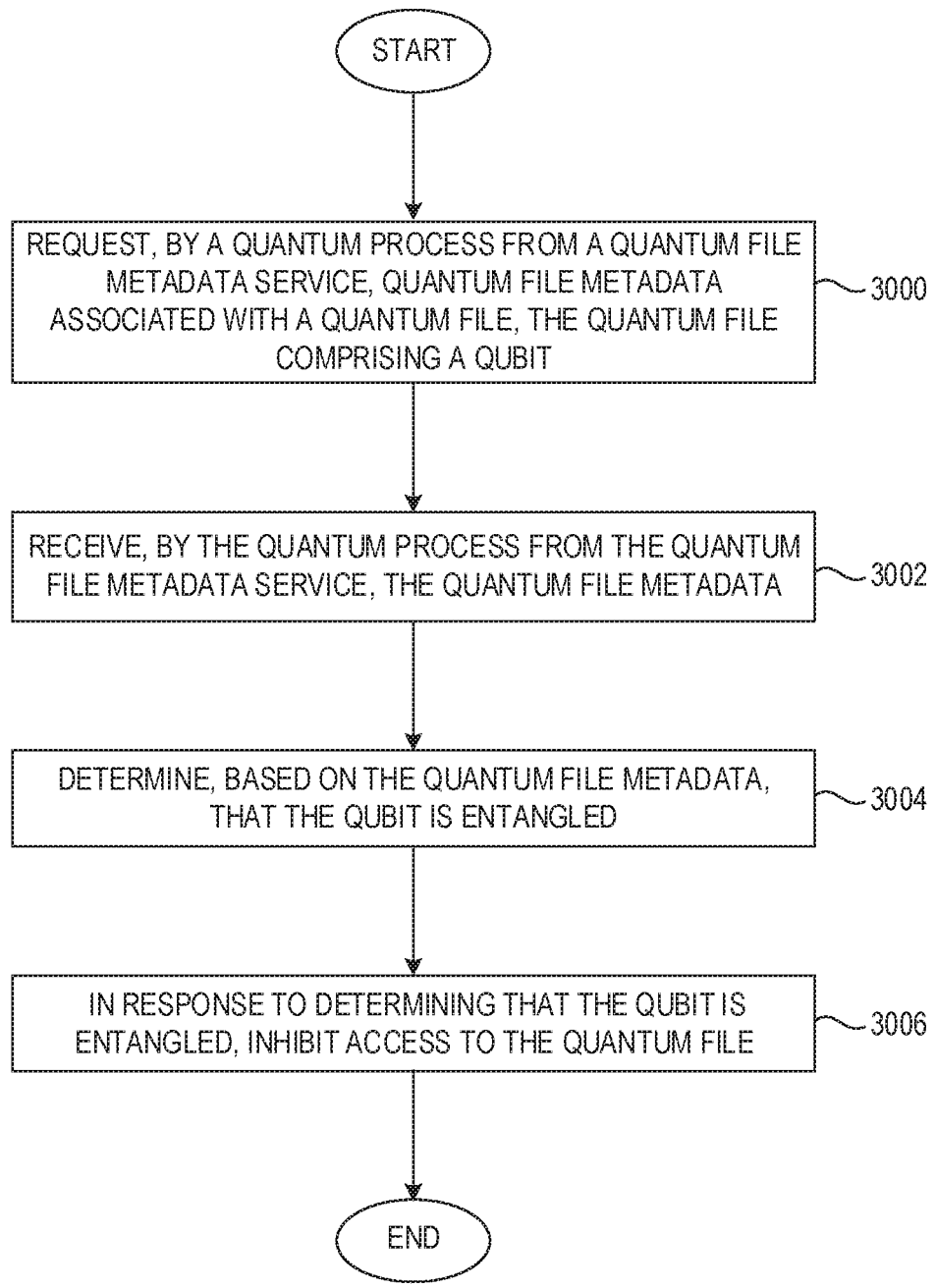
FIG. 5 is a flowchart of a method for a quantum process to access a quantum file metadata service to determine whether a quantum file can be safely accessed according to one example.

FIG. 5 is a flowchart of a method performed by the quantum process 80 for accessing the quantum file metadata service 18 to determine whether the quantum file QF2 can be safely accessed, according to one example. The quantum process 80 requests, from the quantum file metadata service 18, quantum file metadata associated with quantum file QF2, the quantum file QF2 comprising the qubits 20-1-3 and 20-3-2 (FIG. 5, block 3000). The quantum process 80 receives, from the quantum file metadata service 18, the quantum file metadata (FIG. 5, block 3002). The quantum process 80 determines, based on the quantum file metadata, that the qubits 20-1-3 and 20-3-2 are entangled (FIG. 5, block 3004). In response to determining that the qubits 20-1-3 and 20-3-2 are entangled, the quantum process 80 inhibits access to the quantum file QF2 (FIG. 5, block 3006).

FIG. 6 is a diagram of imagery that may be presented on the display device 69 in response to a request from the operator 78 for quantum file metadata, according to one implementation. In this example, assume that the operator 78, via the user interface 74, requests quantum file metadata for all quantum files stored in the folder "L1". The quantum file metadata service 18 accesses the quantum file registry 38 (either directly, or via the quantum file manager 36), and determines that the two quantum files QF1 and QF2 are stored in the folder L1. The quantum file metadata service 18 performs the process described in FIGS. 4A and 4B for each of the quantum files QF1 and QF2. The quantum file metadata service 18 formats the quantum file metadata for the quantum files QF1 and QF2, and generates imagery 82 that depicts the quantum file metadata. The quantum file metadata service 18 presents the imagery 82 on the display device 69. The formatting may include, for example, for each metadata value, a metadata value label that describes a meaning of the metadata value.

As an example, the quantum file metadata service 18 generates metadata labels 84 that identify the meaning of the various metadata 86 obtained from the quantum file registry 38, the qubit registry 22, and the quantum service table 62.

Figure 7:
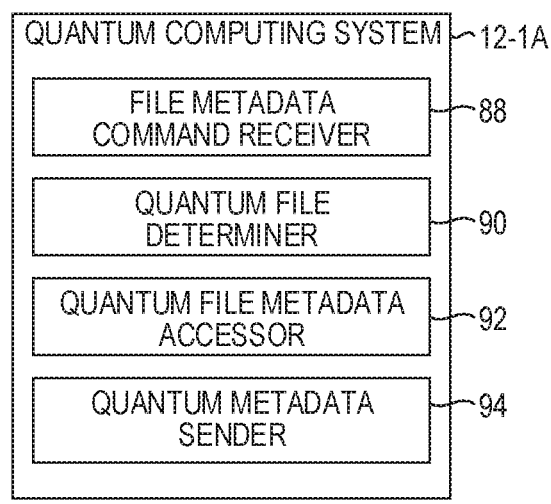
FIG. 7 is a block diagram of a quantum computing system according to another implementation.

FIG. 7 is a block diagram of a quantum computing system 12-1A according to another implementation. The quantum computing system 12-1A implements identical functionality as that described above with regard to the quantum computing system 12-1. The quantum computing system 12-1A includes a file metadata command receiver 88 that is configured to receive a file metadata command requesting quantum file metadata. The file metadata command receiver 88 may comprise executable software instructions configured to program a processor device to implement the functionality of receiving a file metadata command requesting quantum file metadata, may comprise circuitry including, by way of non-limiting example, an application-specific integrated circuit (ASIC), field-programmable gate array (FPGA), or may comprise a combination of executable software instructions and circuitry.

The quantum computing system 12-1A also includes a quantum file determiner 90 that is configured to determine that a quantum file is encompassed by the file metadata command, the quantum file comprising a qubit. In some implementations, the quantum file determiner 90 may comprise executable software instructions configured to determine that a quantum file is encompassed by the file metadata command, the quantum file comprising a qubit, may comprise circuitry including, by way of non-limiting example, an ASIC, FPGA, or may comprise a combination of executable software instructions and circuitry.

The quantum computing system 12-1A also includes a quantum file metadata accessor 92 that is configured to access quantum file metadata that identifies information about the quantum file, the quantum file metadata comprising a qubit identifier that identifies the qubit. The quantum file metadata accessor 92 may comprise executable software instructions to program a processor device to implement the functionality of accessing quantum file metadata that identifies information about the quantum file, the quantum file metadata comprising a qubit identifier that identifies the qubit, may comprise circuitry including, by way of non-limiting example, an ASIC, FPGA, or may comprise a combination of executable software instructions and circuitry.

The quantum computing system 12-1A also includes a quantum metadata sender 94 that is configured to send, to a destination, the quantum file metadata. The quantum metadata sender 94 may comprise executable software instructions to program a processor device to implement the functionality of sending, to a destination, the quantum file metadata, may comprise circuitry including, by way of non-limiting example, an ASIC, FPGA, or may comprise a combination of executable software instructions and circuitry.

Figure 8:
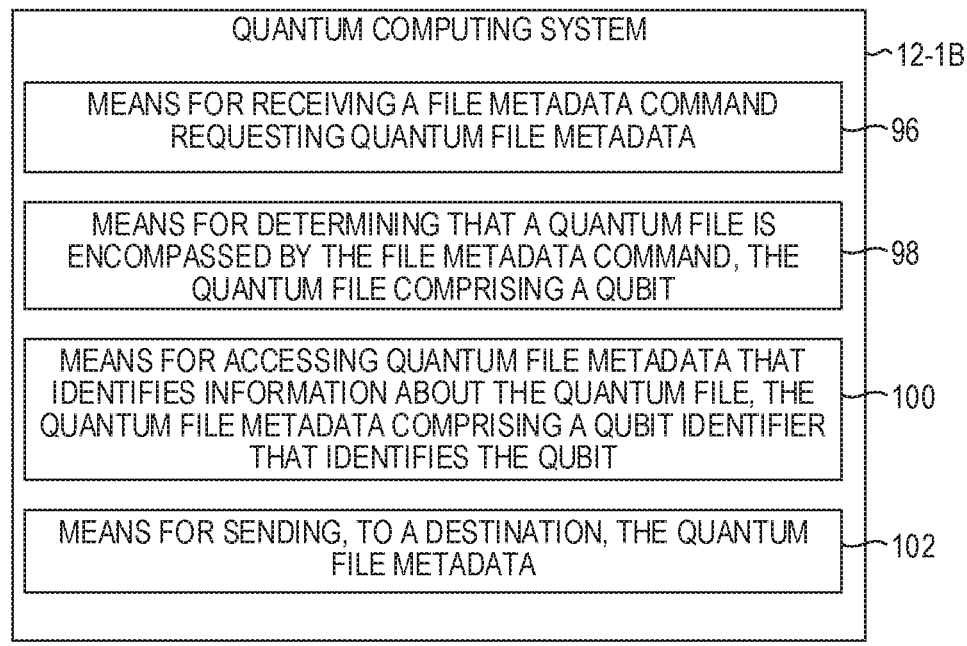
FIG. 8 is a block diagram of a quantum computing system according to another implementation.

FIG. 8 is a block diagram of a quantum computing system 12-1B according to additional implementations. The quantum computing system 12-1B implements identical functionality as that described above with regard to the quantum computing system 12-1. In this implementation, the quantum computing system 12-1B includes a means 96 for receiving a file metadata command requesting quantum file metadata. The means 96 may be implemented in any number of manners, including, for example, via the file metadata command receiver 88 illustrated in FIG. 7. The means 96 may, in some implementations, be implemented via the user interface 74 and/or the API 76.

The quantum computing system 12-1B also includes a means 98 for determining that a quantum file is encompassed by the file metadata command, the quantum file comprising a qubit. The means 98 may be implemented in any number of manners, including, for example, via the quantum file determiner 90 illustrated in FIG. 7. The means 98 may, in some implementations, include analyzing the file metadata command to determine if a single quantum file has been identified in the file metadata command, or if a folder is identified in the file metadata command. In the latter case, the means 98 may also include directly or indirectly accessing the quantum file registry 38 to determine what quantum files are stored in the designated folder.

The quantum computing system 12-1B also includes a means 100 for accessing quantum file metadata that identifies information about the quantum file, the quantum file metadata comprising a qubit identifier that identifies the qubit. The means 100 may be implemented in any number of manners, including, for example, via the quantum file metadata accessor 92 illustrated in FIG. 7. The means 100 may include, by way of non-limiting example, accessing one or more of the quantum file registry 38, the qubit registry 22, and the quantum service table 62, to obtain metadata relating to the designated quantum file, or quantum files.

The quantum computing system 12-1B also includes a means 102 for sending, to a destination, the quantum file metadata. The means 102 may be implemented in any number of manners, including, for example, via the quantum metadata sender 94 illustrated in FIG. 7. The means 102 may include generating a message that contains the metadata, addressing the message to the requestor of the quantum file metadata, and sending the message to the requestor. In other examples the means may include generating imagery that depicts the metadata, and sending the imagery to a display device.

Figure 9:
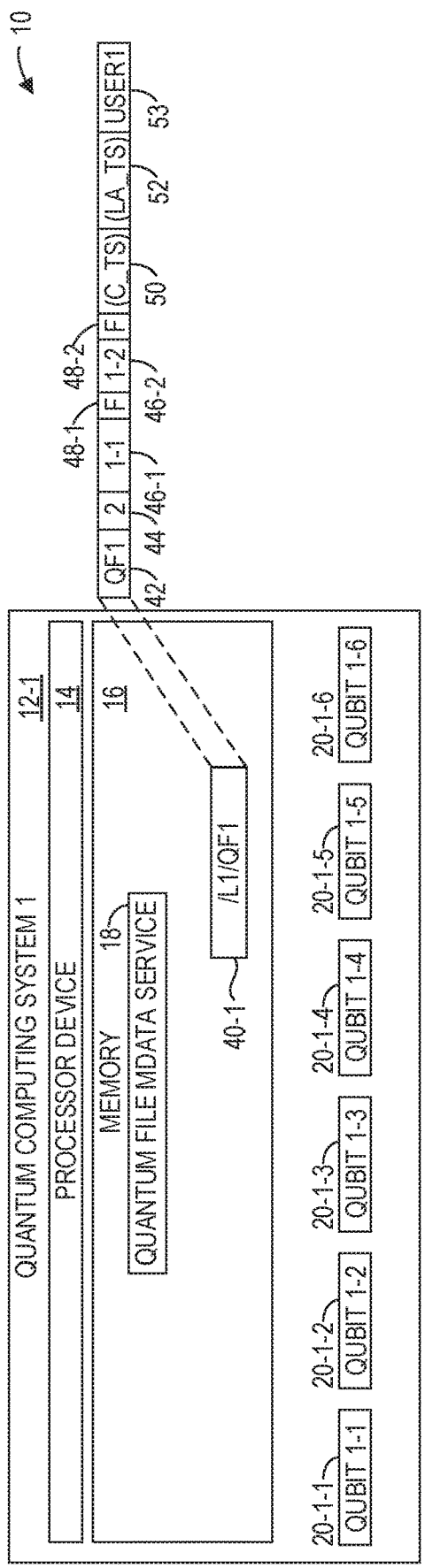
FIG. 9 is a simplified block diagram of the environment illustrated in FIG. 1 according to another implementation.

FIG. 9 is a simplified block diagram of the environment 10 according to another implementation. The quantum computing system 12-1 includes the memory 16 and the processor device 14 coupled to the memory 16. The processor device 14 is to receive a file metadata command requesting quantum file metadata. The processor device 14 is to determine that the quantum file QF1 is encompassed by the file metadata command, the quantum file QF1 comprising the qubits 20-1-1 and 20-1-2. The processor device 14 is to access quantum file metadata, such as the quantum file record 40-1 that identifies information about the quantum file QF1, the quantum file metadata comprising the qubit identifiers 1-1 and 1-2 that identify the qubits 20-1-1 and 20-1-2, respectively. The processor device 14 is to send, to a destination, the quantum file metadata.

Figure 10:
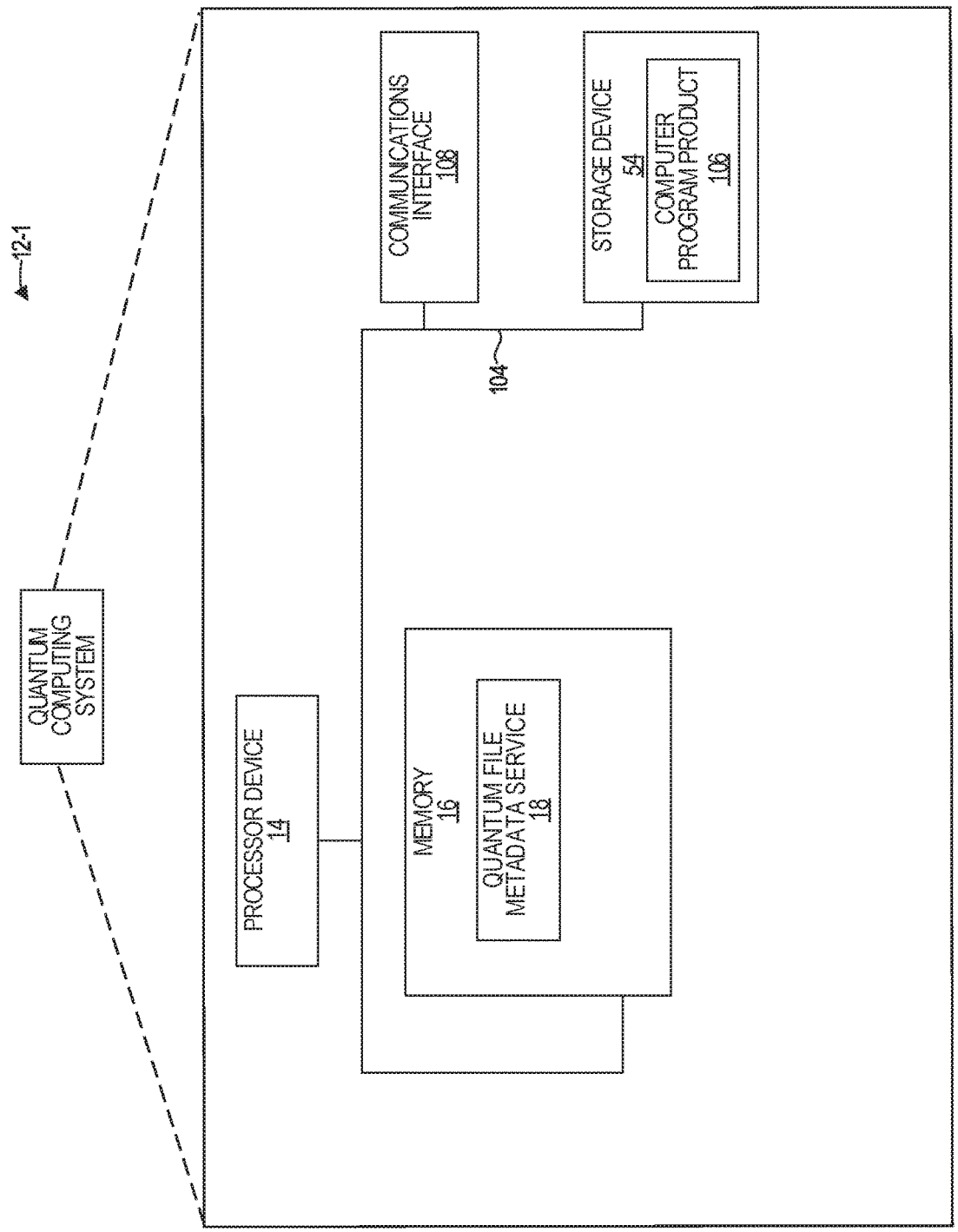
FIG. 10 is a block diagram of a quantum computing system suitable for implementing examples according to one example.

FIG. 10 is a block diagram of the quantum computing system 12-1 suitable for implementing examples according to one example. The quantum computing system 12-1 may comprise any computing or electronic device capable of including firmware, hardware, and/or executing software instructions to implement the functionality described herein in a quantum environment. The quantum computing system 12-1 includes the one or more processor devices 14, the one or more memories 16 and a system bus 104. The system bus 104 provides an interface for system components including, but not limited to, the one or more memories 16 and the one or more processor devices 14. The processor devices 14 can be any commercially available or proprietary processor suitable for operating in a quantum environment. The quantum computing system 12-1 may further include or be coupled to a non-transitory computer-readable storage medium such as the storage device 54. The storage device 54 and other drives associated with computer-readable media and computer-usable media may provide non-volatile storage of data, data structures, computer-executable instructions, and the like.

A number of modules can be stored in the storage device 54 and in the memory 16, including the quantum file metadata service 18. In some implementations, all or a portion of the quantum file metadata service 18 may be maintained on the storage device 54, in the memory 16, or both. All or a portion of the examples may be implemented as a computer program product 106 stored on a transitory or non-transitory computer-usable or computer-readable storage medium, such as the storage device 54, which includes complex programming instructions, such as complex computer-readable program code, to cause the one or more processor devices 14 to carry out the steps described herein. Thus, the computer-readable program code can comprise software instructions for implementing the functionality of the examples described herein when executed on the one or more processor devices 14.

An operator, such as the operator 78, may also be able to enter one or more configuration commands through a keyboard (not illustrated), a pointing device such as a mouse (not illustrated), or a touch-sensitive surface (not illustrated). The quantum computing system 12-1 may also include a communications interface 108 suitable for communicating with other computing devices, including, in some implementations, classical computing devices.

Other computer system designs and configurations may also be suitable to implement the systems and methods described herein. The following examples illustrate various additional implementations in accordance with one or more aspects of the disclosure.

Example 1 is a quantum computing system that includes a file metadata command receiver that is configured to receive a file metadata command requesting quantum file metadata; a quantum file determiner that is configured to determine that a quantum file is encompassed by the file metadata command, the quantum file comprising a qubit; a quantum file metadata accessor that is configured to access quantum file metadata that identifies information about the quantum file; and a quantum metadata sender that is configured to send, to a destination, the quantum file metadata.

Example 2 is the quantum computing system of example 1 further comprising an entanglement checker configured to determine if the qubit is entangled.

Example 3 is a quantum computing system that includes a means for receiving a file metadata command requesting quantum file metadata; a means for determining that a quantum file is encompassed by the file metadata command, the quantum file comprising a qubit; a means for accessing quantum file metadata that identifies information about the quantum file, the quantum file metadata comprising a qubit identifier that identifies the qubit; and a means for sending, to a destination, the quantum file metadata.

Example 4 is the quantum computing system of example 3 further comprising a means for determining if the qubit is entangled.

Example 5 is a method that includes requesting, by a quantum process from a quantum file metadata service, quantum file metadata associated with a quantum file, the quantum file comprising a qubit; receiving, by the quantum process from the quantum file metadata service, the quantum file metadata; determining, based on the quantum file metadata, that the qubit is entangled; and in response to determining that the qubit is entangled, inhibiting access to the quantum file.

Example 6 is the method of example 5 that further includes sending an alert that indicates the quantum process has paused and is awaiting access to the quantum file due to the qubit being entangled.

Example 7 is a quantum computing system that includes a processor device and a memory, the processor device being coupled to the memory to request, from a quantum file metadata service, quantum file metadata associated with a quantum file, the quantum file comprising a qubit; receive, by the quantum process from the quantum file metadata service, the quantum file metadata; determine, based on the quantum file metadata, that the qubit is entangled; and in response to determining that the qubit is entangled, inhibit access to the quantum file.

Example 8 is a method that includes receiving, by a quantum file metadata service, a request for quantum file metadata associated with a quantum file, the quantum file comprising a qubit; obtaining, by the quantum file metadata service, the quantum file metadata; generating, by the quantum file metadata service, formatted quantum file information based on the quantum file metadata; and presenting, on a display device, the formatted quantum file information.

Example 9 is the method of example 8 wherein the request identifies a directory in which the quantum file is located.

Example 10 is the method of example 8 wherein the request identifies the quantum file.

Example 11 is the method of example 10 wherein the formatted quantum file information comprises information about a plurality of quantum files located in the directory, and that further includes generating, by an operations service based on the quantum file metadata, the formatted quantum file information that contains the information about each of the plurality of quantum files; and presenting, on a display device, the formatted quantum file information.

Example 12 is quantum computing system that includes a processor device and a memory, the processor device being coupled to the memory to receive a request for quantum file metadata associated with a quantum file, the quantum file comprising a qubit; obtain the quantum file metadata; generate formatted quantum file information based on the quantum file metadata; and present, on a display device, the formatted quantum file information.

Example 13 is a quantum computing system that includes a quantum file metadata service, a quantum file manager, an entanglement checker, and a qubit registry.

Example 14 is the quantum computing system of example 13 wherein the quantum file metadata service is to communicate with the quantum file manager and the qubit registry to obtain quantum file metadata associated with a quantum file.

Example 15 is the quantum computing system of example 13 wherein the quantum file metadata service is to cause the entanglement checker to determine whether a qubit associated with a quantum file is entangled.

Individuals will recognize improvements and modifications to the preferred examples of the disclosure. All such improvements and modifications are considered within the scope of the concepts disclosed herein and the claims that follow.

What is claimed is:
1. A method comprising:
 receiving, by a quantum computing system, a file metadata command requesting quantum file metadata;

determining, by the quantum computing system, that a quantum file of a plurality of quantum files is encompassed by the file metadata command, the quantum file comprising a plurality of qubits;

accessing, by the quantum computing system, quantum file metadata that identifies information about each qubit of the plurality of qubits of the quantum file, the quantum file metadata comprising at least a qubit identifier that identifies each qubit of the plurality of qubits, wherein the quantum file metadata identifies the qubits as being implemented on a quantum computing system; and sending, by the quantum computing system to a destination, the quantum file metadata.

2. The method of claim 1 wherein the file metadata command identifies the quantum file.

3. The method of claim 1 wherein determining that the quantum file is encompassed by the file metadata command further comprises:

determining that a plurality of quantum files, including the quantum file, is encompassed by the file metadata command, each quantum file of the plurality of quantum files comprising a corresponding qubit;

accessing, by the quantum computing system, quantum file metadata that identifies information about each quantum file of the plurality of quantum files, the quantum file metadata for each quantum file comprising a corresponding qubit identifier that identifies the corresponding qubit; and sending, by the quantum computing system to the destination, the quantum file metadata.

4. The method of claim 3 wherein the file metadata command identifies a directory in which the quantum file is located.

5. The method of claim 1 further comprising:

generating formatted quantum file information based on the quantum file metadata; and presenting, on a display device, the formatted quantum file information.

6. The method of claim 1 wherein the quantum file metadata comprises an entanglement flag that identifies whether the qubits are entangled.

7. The method of claim 1 wherein the quantum file metadata comprises a creation timestamp that identifies a date of creation of the quantum file.

8. The method of claim 1 wherein the quantum file metadata comprises a last access timestamp that identifies a date of last access of the quantum file.

9. The method of claim 1 wherein the quantum file metadata comprises a quantum service identifier that identifies a quantum service that utilizes the quantum file.

10. The method of claim 1 wherein the quantum file metadata comprises a quantum assembly language (QASM) file identifier that identifies a QASM file that implements a quantum service that utilizes the quantum file.

11. The method of claim 1 wherein accessing the quantum file metadata comprises obtaining, from a quantum file registry that comprises metadata about a plurality of quantum files including the quantum file, quantum file metadata that identifies the qubits.

12. The method of claim 11 further comprising obtaining, from a qubit registry that comprises metadata about a plurality of qubits including the qubits, qubit location information that identifies a quantum computing system on which the qubits are implemented, and the qubit identifiers that identify the qubits.

13. The method of claim 1 wherein accessing the quantum file metadata comprises obtaining, from a quantum service manager configured to implement quantum services on the quantum computing system, a status of a quantum service that utilizes the quantum file.

14. The method of claim 1 further comprising:

parsing a QASM file in accordance with a QASM programming language syntax;

identifying a QASM programming instruction that, when executed, causes at least one qubit to be entangled; and including, in the quantum file metadata, an entanglement indicator that indicates that the at least one qubit is entangled.

15. The method of claim 14 further comprising:

accessing, by the quantum computing system, information that indicates that a quantum service implemented by the QASM file is in an execution state; and wherein including, in the quantum file metadata, the entanglement indicator that indicates that the at least one qubit is entangled is based on the information that indicates that the quantum service implemented by the QASM file is in the execution state.

16. A quantum computing system, comprising:

a memory; and a processor device operable to perform operations on qubits, the processor device coupled to the memory to:

receive a file metadata command requesting quantum file metadata;

determine that a quantum file of a plurality of quantum files is encompassed by the file metadata command, the quantum file comprising a plurality of qubits;

access quantum file metadata that identifies information about each qubit of the plurality of qubits of the quantum file, the quantum file metadata comprising at least a qubit identifier that identifies each qubit of the plurality of qubits, wherein the quantum file metadata identifies the qubits as being implemented on a quantum computing system; and send, to a destination, the quantum file metadata.

17. The quantum computing system of claim 16 wherein to determine that the quantum file is encompassed by the file metadata command, the processor device is further to:

determine that a plurality of quantum files, including the quantum file, is encompassed by the file metadata command, each quantum file of the plurality of quantum files comprising a corresponding qubit;

access quantum file metadata that identifies, for each quantum file of the plurality of quantum files, a corresponding qubit identifier that identifies the corresponding qubit; and send, to the destination, the quantum file metadata.

18. A non-transitory computer-readable storage medium that includes instructions to cause a processor device to:

receive a file metadata command requesting quantum file metadata;

determine that a quantum file is encompassed by the file metadata command, the quantum file comprising a plurality of qubits;

access quantum file metadata that identifies information about each qubit of the plurality of qubits of the quantum file, the quantum file metadata comprising at least a qubit identifier that identifies each qubit of the plurality of qubits, wherein the quantum file metadata identifies the qubits as being implemented on a quantum computing system; and send, to a destination, the quantum file metadata.

* * * * *